Dec. 4, 1956  W. A. PENNOW  2,773,171
LUMINAIRE
Filed April 26, 1952  3 Sheets-Sheet 1

WITNESSES:
Robert Baird
Leoy M. Garman

INVENTOR
Willis A. Pennow.
BY
Arthur T. Stratton
ATTORNEY

Dec. 4, 1956 W. A. PENNOW 2,773,171
LUMINAIRE
Filed April 26, 1952 3 Sheets-Sheet 2

WITNESSES:
Robert C. Baird
Leo M. Garman

INVENTOR
Willis A. Pennow.
BY Arthur T. Stratton
ATTORNEY

Dec. 4, 1956   W. A. PENNOW   2,773,171
LUMINAIRE
Filed April 26, 1952   3 Sheets-Sheet 3

WITNESSES:
Robert O. Baird
Leon M. Garman

INVENTOR
Willis A. Pennow.
BY
Arthur T. Stratton
ATTORNEY

United States Patent Office 2,773,171
Patented Dec. 4, 1956

2,773,171

LUMINAIRE

Willis A. Pennow, Cleveland, Ohio, assignor to Westinghouse Electric Corporation, East Pittsburgh, Pa., a corporation of Pennsylvania Application April 26, 1952, Serial No. 284,562

8 Claims. (Cl. 240—1.2)

This invention relates generally to luminaires, and, more particularly, to luminaires having an auxiliary light controlling element associated therewith.

Generally in the past, where a luminaire consisting of a light source and lens has been equipped with an auxiliary light controlling element, such as a shield, reflector, or the like, the auxiliary element has been mounted on a structural member which forms a part of the support for the light source or lens. This has caused difficulty because any variations in the lens, or in dimensions of the support, or variations caused by tolerances of assembled parts of the luminaire, severally or in combination, cause displacement of the auxiliary element from its proper relationship with the lens. This becomes a serious problem where precise light control is desired in order to maintain a high efficiency, as individual adjustments of each luminaire are required to obtain the desired results, and this, of course, precludes the free interchange of component parts when repair or replacement thereof becomes necessary.

Accordingly, one object of this invention is to provide a luminaire having novel provision for mounting a light controlling element in precise predetermined position relative to the lens of the luminaire.

Another object of this invention is to provide a luminaire having a novel arrangement for mounting a light controlling element directly on the lens of the luminaire.

A more specific object of this invention is to provide integral positioning and locating means on the lens of a luminaire for cooperation in a novel manner with a light controlling element for mounting the element in a predetermined relation to the lens.

Another object of this invention is to provide a novel, relatively simple assembly of a light controlling element with a luminaire, which is capable of locating the element in predetermined position relative to the lens of the luminaire without the necessity of any tools for assembly or disassembly of the light controlling element.

While auxiliary lenses have in the past been directly mounted on a light refractory as by being cemented in place, such an arrangement obviously is not interchangeable and is more expensive, as some arrangement must be provided for holding the parts in the desired position during the time required for the cement to set. In the case of a bowl-shaped type of refractor, an auxiliary lens has been mounted therein by the expedient of providing slots in opposite side walls of the refractor for receiving opposite edges of a rigid auxiliary element. However, any variation in the refractor or auxiliary element again results in lack of precise positioning of the element, and in any event this type of mounting would not be suitable for other types of refractors or lenses, without the use of cement.

Another object of this invention, therefore, is to provide an auxiliary light controlling element having yieldable means for directly engaging integral formations on a lens, for both definitely locating the element relative to the lens, and for securing them together in a releasable manner by the mere act of assembly.

These and other objects of this invention will become more apparent upon consideration of the following detailed description of one embodiment thereof, when taken in connection with the attached drawings, in which.

Figure 1:
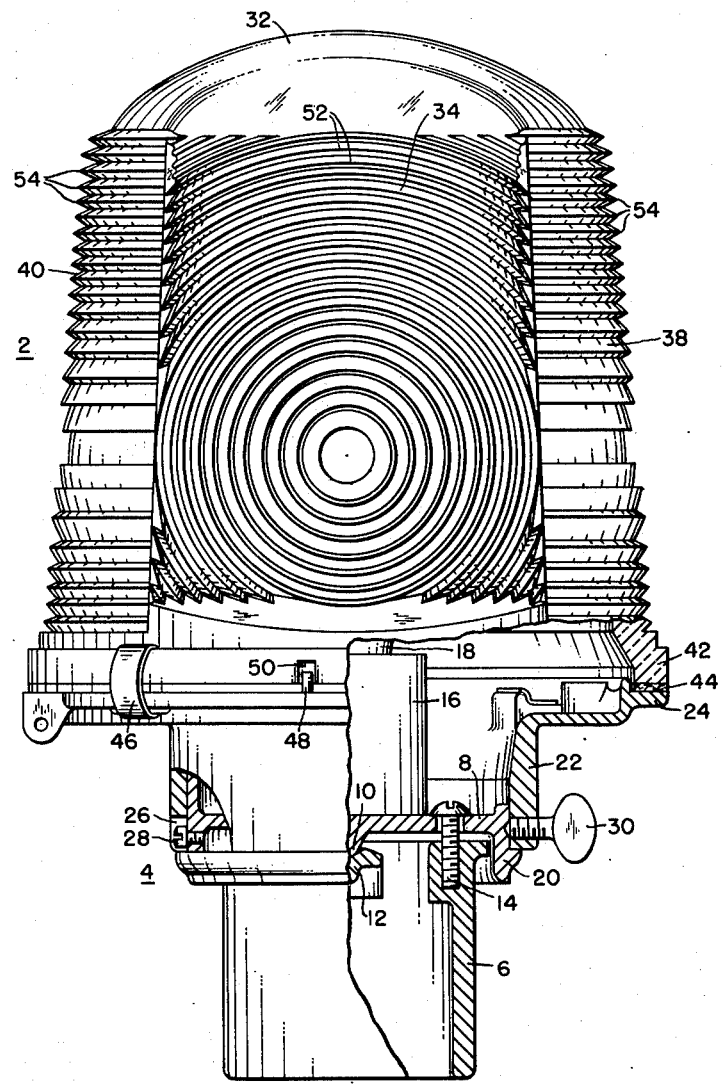
Figure 1 is a side elevation view of a luminaire embodying this invention, with a portion thereof being shown in section.
Figure 2:
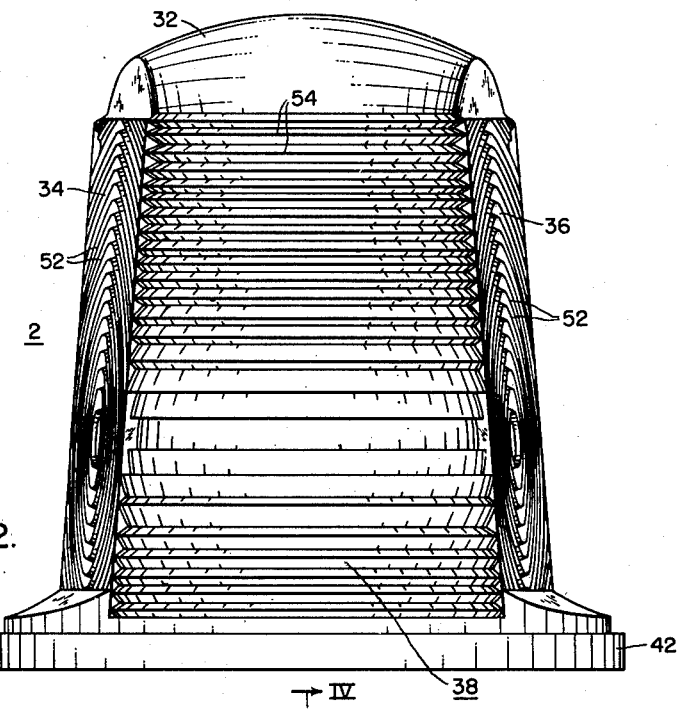
Fig. 2 is a side elevation view of the lens employed in the luminaire shown in Fig. 1, looking at the right side of the lens, as viewed in Fig. 1.

This invention is not restricted to use with any particular type of luminaire, or any particular type of lens structure, since it is concerned with a particular way in which auxiliary light controlling devices may be secured in predetermined position with respect to lenses of various types. Moreover, the auxiliary elements may be of various types, such as color filters, light shields or reflectors. The invention is herein specifically disclosed in connection with a luminaire of the type shown in applicant's copending application Serial No. 243,672 on a lighting unit, filed August 25, 1951, and assigned to the same assignee of this invention. It will be understood, however, that the luminaire and lens are merely illustrative of one application of this invention.

The luminaire, including its lens shown on the drawings, and in applicant's copending application mentioned above, generally comprises a lens 2 and its support 4. The lens support includes a lower tubular sleeve 6 adapted to be mounted on a supporting post or the like (not shown) and is adapted to adjustably support, at its upper end, a supporting plate 8. A substantially centrally located supporting lug 10 is provided integral with the underside of supporting plate 8, and it is adapted to be supported in a central depression formed in a transverse strut 12 extending across the upper end of supporting sleeve 6. The supporting plate 8 may be secured at any desired angular position by means of adjusting screws 14 (only one of which is shown) which pass through openings provided in the supporting plate 8 and are threadedly engaged in suitably threaded apertures provided in the upper end of supporting sleeve 6.

Supporting plate 8 carries the light source and lens, having a lamp socket 16 secured substantially centrally at the upper side thereof in which a light source, such as a lamp 18, may be mounted. The supporting plate 8 is provided with a peripheral flange 20 having an exterior shoulder on which rests the lower end of a supporting collar 22. The upper end of supporting collar 22 is provided with a flange 24 on which the lens 2 is seated. In order to properly orient the supporting collar 22 about a vertical axis, it is provided with a notch 26 in the bottom edge thereof for receiving a positioning screw 28 secured in the flange 20 of supporting plate 8. A thumb screw 30 is also provided threaded in an opening extending through the lower end of supporting collar 22, to lock the collar against any movement with respect to the supporting plate 8, when the locking screw 30 is tightened.

The lens 2 is constructed of one piece of transparent material, such as glass or the like, and includes a rounded top 32 and a pair of substantially opposed flat sides 34 and 36, which may, however, be positioned at a slight angle to each other as illustrated, with these two flat sides being connected by a relatively short curved side 38, and a relatively long curved side 40. The lower end of the lens 2 terminates in a base flange 42 which is adapted to seat on a sealing gasket 44 positioned on the flange 24 of the supporting collar 22. The lens 2 can thus be seen to comprise a one-piece lens of inverted generally bowl-shaped form, with the sides thereof having a slight taper upwardly to facilitate molding thereof. The lens 2 is secured to the supporting collar 22 by substantially U-shaped spring clips 46 (only one of which is shown) which engage the top of the lens base flange 42 and the underside of supporting collar flange 24 at spaced points about their peripheries. In order to properly position the lens 2 with respect to a vertical axis, a number of notches 50 are provided in the periphery of the base flange 42 of the lens to receive a positioning lug 48 secured to the flange 24 of the supporting collar 22.

The lens 2 is provided with light directing prisms of various types comprising annularly arranged circular prisms 52 on each of the flat sides 34 and 36 of the lens to form bull's-eye-lenses on each of these sides. The curved sides 38 and 40 of the lens are provided exteriorly with horizontally arranged ridges or prisms 54, which follow the circular contour of these sides; and one side, for example the side 40, may be provided interiorly with vertically extending prisms 56 at selected portions thereof. The reason for the particular arrangement of prisms in this particular lens is that it is especially designed for use as an airport runway light, with the opposed bull's-eye lenses adapted to direct light substantially in opposite directions along the runway boundary, and with the longer curved side 40 adapted to direct a limited fan-shaped horizontal beam of light away from the runway, and with the shorter curved side 38 being adapted to transmit but an extremely limited amount of light, being essentially adapted to reflect the major part of the light impinging on its inner surface back into the lens to be transmitted through the remaining sides thereof.

In the above-mentioned copending application, there is disclosed a separate filter or shield which may be employed either to give a distinctive color to the emitted light, or to assist in reflecting the light back into the lens which would otherwise impinge on the shorter curved side 38. In the copending application, it is contemplated that such auxiliary element will be supported on the supporting collar 22 independently of the lens 2.

In accordance with this invention, however, the auxiliary light controlling element is more precisely positioned with respect to the lens by a particular cooperation of the lens and auxiliary element which enables the latter to cooperate directly with the lens so as to be mounted directly on the lens in predetermined relation with respect to the light deflecting prisms and other elements of the lens. The auxiliary element specifically disclosed herein comprises a reflector 58, integrally formed from one piece of a suitable yieldable light reflecting material 59, which may be metal, such as anodized aluminum. In order to definitely locate the auxiliary element relative to the lens 2, the lens is modified by the provision of integral vertically extending ribs 60 and 62 on the inner surface of the short curved side 38 adjacent its juncture with the flat sides 34 and 36, respectively, and it will be noted that these ribs, and particularly the inner sides thereof, converge both in the lateral and longitudinal directions, for a purpose to be described. Preferably, the ribs 60 and 62 are integrally formed by the same molding operation which forms the light directing prisms of the lens so that they are precisely positioned relative to the light directing portions of the lens. Each rib 60 and 62 has a detent notch 64 cut in the lower end thereof and also precisely located relative to the light directing prisms of the lens, for a purpose which will be later described.

The reflector 58 may be readily formed by a single die-forming operation out of sheet material to be provided with a depressed, spherical, substantially centrally located portion 66 adapted to be positioned in opposition to the light source of the luminaire. An upper notch 68 is provided in each side of the reflector 58, and a lower notch 70 is provided in each side of the reflector 58 to define upper and lower yieldable tabs 71 and 72, respectively, which are integral with the reflector plate, and which are rearwardly bent at an angle corresponding to the convergent angle of the inner sides of locating ribs 60 and 62 of the lens. There is also provided on one set of tabs, herein shown to be the lower set, integral detent tabs 74 directed forwardly on the upper side edge of each of the lower tabs 72.

The reflector 58 is shown in assembled position in the drawings, wherein it will be observed that the tabs 71 and 72 are in intimate engagement with the inner sides of the ribs 60 and 62 of the lens, and the detent tabs 74 are located in the detent notches 64 of the lens ribs 60 and 62. The reflector 58 may be readily assembled by merely sliding it into the open lower end of the lens 2 with the upper tabs 71 located between the lens ribs 60 and 62. It will be noted that the upper lens tabs 71 are closer together than the lower lens tabs 72 due to the longitudinal convergence of the lens ribs 60 and 62, but normally the outer ends of both sets of tabs 71 and 72 are spaced apart a greater distance than the inner surfaces of the lens ribs 60 and 62 at the locations along the ribs which these tabs occupy when they are at their assembled positions, respectively. Accordingly, when the reflector 58 is inserted in the lower end of the lens 2, the upper reflector tabs 71 freely enter the space between lens ribs 60 and 62, and the reflector may be freely inserted until it is near its operative position shown in Fig. 4. At this time, due to the longitudinal convergence of ribs 60 and 62, both sets of tabs 71 and 72 are stressed inwardly by the camming action of ribs 60 and 62 thereon, thus stressing the tabs 71 and 72 and forcing the outer edges thereof into intimate engagement with the inside corners of ribs 60 and 62 due to the lateral convergence of the inner surfaces of ribs 60 and 62. This camming or wedging action continues until the detent tabs 74 which ride up on the outer edges of the lens ribs 60 and 62, respectively, reach a position opposite the detent notches 64 whereupon they suddenly drop into these notches due to the pressure exerted on the lower tab 72 tending to crowd them into the inner corners formed by the juncture of the inner surfaces of ribs 60 and 62 with the adjacent inner surface of the short side 38 of the lens.

Figure 3:
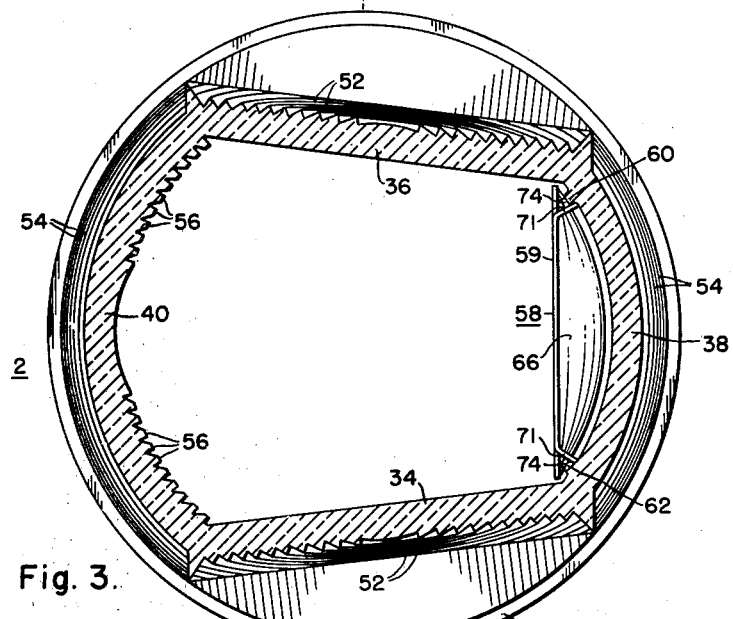
Fig. 3 is a horizontal cross-section view of the lens shown in Figs. 1 and 2, and taken substantially on the line III—III of Fig. 4.
Figure 6:
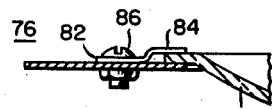
Fig. 6 is a partial sectional view of the element shown in Fig. 5 taken substantially on the line VI—VI thereof.
Figure 4:
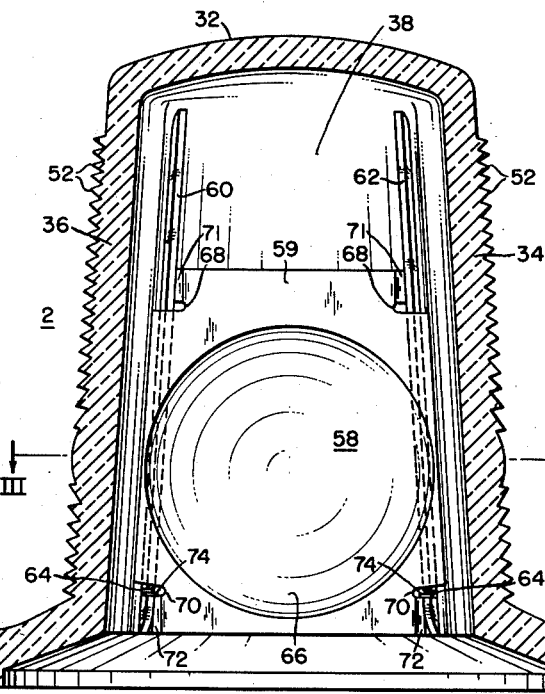
Fig. 4 is a vertical cross-section view of the lens shown in the preceding figures and taken substantially on the line IV—IV of Fig. 3.

The reflector 58 may be just as readily removed by slightly lifting the lower edge thereof and longitudinally sliding it out of the open lower end of the lens 2. However, when the lens is in its operative position, as shown in Figs. 3 and 4, it is firmly held in a predetermined position with respect to the lens itself, by direct engagement with the guide ribs 60 and 62 formed integral with the lens, and the stops formed by detent notches 64, also integral with the lens. It is apparent then that since the reflector 58 may be formed by a single die-forming operation, it is precisely located with respect to the light directing prisms of the lens 2.

It is apparent that the reflector 58 may be readily assembled or disassembled with the lens 2 without the use of any tools, by a very simple operation which does not introduce any positioning errors, but may be accomplished very easily and quickly, and but little skill is required. This means that auxiliary light controlling elements, such as the reflector 58, are fully interchangeable with other types of auxiliary light controlling elements, such as filters or shields, in an easy and simple manner, and yet the auxiliary element will always be precisely positioned with respect to the light directing elements of the lens itself.

Figure 5:
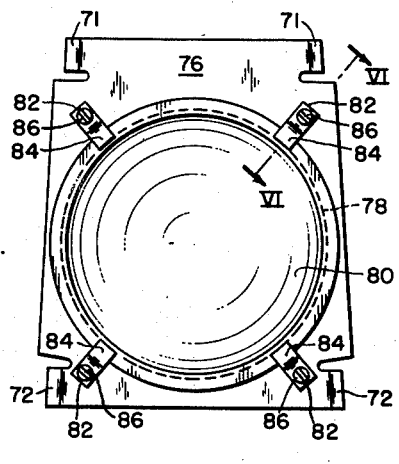
Fig. 5 is a plan view of a modified form of light directing element which can be used with a lens similar to that shown in Figs. 1 to 4.

It has been pointed out that this invention may be used with lenses of all types, and may be used with auxiliary light controlling elements other than reflectors. Thus, the invention would be equally useful with a single lens located substantially in a single plane for the purpose of precisely locating a light filter intermediate the light source and the lens. It also could obviously be used in other types of cylindrical lens than the precise form shown and described herein. Similarly, it has been pointed out that other types of auxiliary light controlling elements and reflectors can advantageously employ the teachings of this invention, and the mere fact that the bodies of such auxiliary elements may be of a relatively rigid material, such as glass or the like, does not prevent their employment of the principles of this invention because positioning and securing tabs, such as the tabs 71, 72 and 74 specifically described herein of yieldable material, could be secured to such rigid elements, or be part of a frame in which such elements are accurately located, for supporting them in precise position relative to a lens in the same manner as the reflector 58 described above. Thus, for example a frame 76 can be formed, as shown in Fig. 5, in substantially the same way as reflector 58 except that an opening 78 is formed therein. A light directing member 80 of glass or other transparent or translucent rigid material may be secured in place over the opening 78 by angled clamps 82 having outer portions 84 engaging the outer surface of light directing member 80 under pressure of clamping screws 86 which secure the clamps to frame 76. In all other respects, frame 76 is identical with reflector 58 in that it has tabs 71, 72 and 74 for engagement with the lens.

Having described one embodiment of this invention in accordance with the Patent Statutes, it is to be understood that the invention is not limited to this precise construction for the reasons pointed out, and accordingly is not to be limited thereto but should be construed broadly for application to other types of lenses and other types of auxiliary light controlling elements.

I claim as my invention:

1. A lens of light transmitting material having at least a portion which is annular in form for receiving a light source when in position, said lens having spaced generally longitudinally extending integral rectilinear ribs which converge both laterally away from the lens and longitudinally from one edge of the lens so that a light directing element may be directly mounted on said lens by engagement of yieldable portions thereof with the inner sides of said ribs.

2. A lens of light transmitting material having at least a portion which is annular in form for receiving a light source when in position, said lens having spaced generally longitudinally extending integral rectilinear ribs which converge both laterally away from the lens and longitudinally from one edge of the lens so that a light directing element may be directly mounted on said lens by engagement of yieldable portions thereof with the inner sides of said ribs, and at least one of said ribs having a transverse detent notch therein.

3. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction, an auxiliary light controlling element having yieldable portions at opposite sides thereof extending angularly from said element in one direction, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens, and cooperating detent means on said lens and element positioned to be engageable at the aforesaid operative position of said element.

4. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction with at least the inner sides of said ribs converging in a direction generally laterally outwardly of the surface of the lens between them, an auxiliary light controlling element having yieldable portions at opposite sides thereof which diverge in a direction toward the lens so as to be substantially parallel to the inner sides of said ribs, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens.

5. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction with at least the inner sides of said ribs converging in a direction longitudinally and inwardly of the ribs, an auxiliary light controlling element having yieldable portions at opposite sides thereof extending angularly from said element in one direction, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens.

6. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction with at least the inner sides of said ribs converging in a direction generally laterally outwardly of the surface of the lens between them and in a direction longitudinally and inwardly of the ribs, an auxiliary light controlling element having yieldable portions at opposite sides thereof which diverge in a direction toward the lens so as to be substantially parallel to the inner sides of said ribs, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens.

7. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction, an auxiliary light controlling element having yieldable portions at opposite sides thereof extending angularly from said element in one direction, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens, and cooperating detent means on said lens and element positioned to be engageable at the aforesaid operative position of said element comprising, a notch in at least one of said ribs extending transversely thereof, and an integral lug on the corresponding yieldable portion positioned to ride on said one rib during the longitudinal movement of said element in mounting and withdrawing it from the lens.

8. A luminaire comprising, a support, means on said support for receiving a light source, a lens also mounted on said support at a predetermined position relative to said source receiving means, said lens having spaced integral projecting ribs on its inner surface extending away from one edge of the lens in substantially the same direction, an auxiliary light controlling element having yieldable portions at least at opposite sides thereof extending toward said ribs, respectively, said yieldable portions having the free ends thereof spaced apart a greater distance than the distance between the inner sides of said ribs at least at the operative position of said element, so that the yieldable portions are adapted to be inserted between said ribs at said one edge of the lens and moved longitudinally of the ribs inwardly to the operative position of said element where its yieldable portions engage inner sides of said ribs under stress to definitely locate said element in a direction relative to said lens transverse to said ribs, while permitting removal of said element by merely withdrawing it longitudinally of the ribs from said one edge of the lens.

References Cited in the file of this patent

UNITED STATES PATENTS

| | | |
|---|---|---|
| 205,846 | Ewing et al. | July 9, 1878 |
| 922,958 | Ryan | May 25, 1909 |
| 959,387 | Richmond | May 24, 1910 |
| 1,637,622 | Radford | Aug. 2, 1927 |
| 1,773,831 | Walthers | Aug. 26, 1930 |
| 2,021,611 | Rolph | Nov. 19, 1935 |
| 2,170,912 | Rolph | Aug. 29, 1939 |
| 2,191,379 | Glasgow | Feb. 20, 1940 |
| 2,336,416 | Parker | Dec. 7, 1943 |

OTHER REFERENCES

Westinghouse Engineer, November 1950, page 254.